(12) United States Patent
Kim et al.

(10) Patent No.: US 9,385,840 B2
(45) Date of Patent: Jul. 5, 2016

(54) MULTICAST APPARATUS AND METHOD

(71) Applicant: ELECTRONICS AND TELECOMMUNICATIONS RESEARCH INSTITUTE, Daejeon (KR)

(72) Inventors: Kyeong-Tae Kim, Daejeon (KR);
Soo-Hyung Lee, Daejeon (KR);
Hyung-Kook Jun, Seoul (KR);
Kyung-Il Kim, Daejeon (KR);
Yong-Yeon Kim, Daejeon (KR);
Won-Tae Kim, Asan-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 268 days.

(21) Appl. No.: 14/253,136

(22) Filed: Apr. 15, 2014

(65) Prior Publication Data

US 2014/0351666 A1 Nov. 27, 2014

(30) Foreign Application Priority Data

May 23, 2013 (KR) .................. 10-2013-0058260

(51) Int. Cl.
| | | |
|---|---|---|
| *H04L 1/14* | (2006.01) | |
| *H04L 1/16* | (2006.01) | |
| *H04L 1/18* | (2006.01) | |
| *H04L 1/00* | (2006.01) | |

(52) U.S. Cl.
CPC ............ *H04L 1/1685* (2013.01); *H04L 1/18* (2013.01); *H04L 2001/0093* (2013.01); *H04L 2201/08* (2013.01)

(58) Field of Classification Search
CPC ..... H04L 2201/08; H04L 1/1685; H04L 1/18; H04L 2001/0093

USPC .......................................................... 714/748
See application file for complete search history.

(56) References Cited

U.S. PATENT DOCUMENTS

| | | | | |
|---|---|---|---|---|
| 6,044,205 A | * | 3/2000 | Reed ................. | G06Q 30/0601 707/999.001 |
| 8,635,506 B2 | * | 1/2014 | Kim ..................... | H04L 1/1685 714/749 |
| 2005/0207354 A1 | | 9/2005 | Nekovee et al. | |
| 2006/0114848 A1 | | 6/2006 | Eberle et al. | |
| 2010/0260180 A1 | | 10/2010 | Wu et al. | |
| 2013/0132807 A1 | * | 5/2013 | Moreman .......... | H04N 21/6375 714/807 |

FOREIGN PATENT DOCUMENTS

| | | |
|---|---|---|
| KR | 2001-0017359 A | 3/2001 |
| KR | 10-2001-0039241 A | 5/2001 |
| KR | 10-2009-0054759 A | 6/2009 |
| KR | 10-2010-0066839 A | 6/2010 |
| KR | 10-2010-0070361 A | 6/2010 |

* cited by examiner

*Primary Examiner* — David Ton
(74) *Attorney, Agent, or Firm* — NSIP Law

(57) ABSTRACT

Disclosed herein are a multicast apparatus and method. In the multicast method, a multicast apparatus searches one or more communication objects in a distributed network environment. Multicast data is received from a sender-side communication object among the one or more communication objects. A polling message is received from the communication object that transmitted the multicast data. A response message corresponding to the polling message is sent. It is determined whether a transmission error has occurred between communication objects based on results of sending of the response message, and multicasting is performed based on results of determination.

8 Claims, 8 Drawing Sheets

```
Case status(seq) {
Unsent :
   If(status(seq)==Unsent)
   {
     multicast(seq);
     status(seq) = Underway;
   }
Underway :
   if(nacked(seq)!=null) {status(seq) = In_Collection;}
   else status(seq) = Acknowledged;
In_Collection:
   if(The # of nacked(seq)>MTR)
      for each Ri € naked(seq) U repolled(seq) = {*}
         multicast(seq); status(seq) = Retransmitted;
   else if (acked(seq) U nacked(seq) U repolled(seq) = {*}
      for each Ri € naked(seq)
         unicast(seq);  status(seq) = Retransmitted;
Retransmitted :
   if(received NACK from Ri)
      unicast packet to Ri
```

FIG. 8

MULTICAST APPARATUS AND METHOD

CROSS REFERENCE TO RELATED APPLICATION

This application claims the benefit of Korean Patent Application No. 10-2013-0058260 filed on May 23, 2013, which is hereby incorporated by reference in its entirety into this application.

BACKGROUND

1. Field

The present invention relates generally to a multicast apparatus and method and, more particularly, to a multicast apparatus and method, which guarantee reliability in a distributed network environment.

2. Description of Related Art

With progress in the realization of high-performance, small-size, and low-cost of information technology (IT) resources, IT resources such as computing, control, and communication resources have been rapidly configured as embedded resources in almost all traditional industrial areas, such as automobiles, shipbuilding, transportation, construction, power, and environment, as well as the embedded software (SW) areas of existing IT industry. In this way, industries and products having aspects completely different from those of existing industries and products based on the configuration of IT resources as embedded IT resources have appeared over all industrial areas. Since the number of objects corresponding to elements constituting the overall system has increased incomparably faster than the number of objects of existing networks, it is impossible to use a point-to-point communication method from the standpoint of an application.

Therefore, a one-to-many communication method for transmitting data to a specific number of objects desiring to receive data by using a multicast method which is one of a variety of efficient data transmission methods is required.

However, in order to actually apply a multicast service to in a large-scale distributed network environment, a problem may arise in that, even if the number of communication objects increases, reliability services must be provided.

This means that it is required to be able to detect a transmission failure and error occurring in a specific communication object and to recover such a failure and error in real time while large-scale communication objects are simultaneously transmitting/receiving data. However, as the number of communication objects, the number of data messages, the number of control messages required to detect errors, and the number of messages to be retransmitted for error recovery explosively increase in a network, it becomes more difficult to meet such requirements.

For example, there is technology disclosed in Korean Patent Application Publication No. 10-2010-0070361 entitled "Method and apparatus for performing adaptive forward error correction in response to combined automatic repetition requests for reliable multicast in wireless local area networks." This patent describes only technology for forming a plurality of layers using Forward Error Correction (FEC) and Automatic Repeat Request (ARQ) in a multicast application requiring reliability, detecting the type of received packet, and selecting an error correction method corresponding to the received packet type.

In this way, in a large-scale distributed network environment, a new multicast method is required to actually apply a multicast service. In order to support such a multicast service, a mechanism must be provided which greatly reduces the number of messages by controlling a number of messages explosively increasing in the network in spite of an increase in the number of communication objects, and then detects a transmission failure and error in a specific communication object and recovers such a failure and error in real time.

SUMMARY

Accordingly, the present invention has been made keeping in mind the above problems occurring in the prior art, and an object of the present invention is to provide a multicast apparatus and method, which guarantee reliability in a distributed network environment.

In accordance with an aspect of the present invention to accomplish the above object, there is provided a multicast method including searching, by a multicast apparatus, one or more communication objects in a distributed network environment; receiving multicast data from a sender-side communication object among the one or more communication objects; receiving a polling message from the communication object that transmitted the multicast data; sending a response message corresponding to the polling message; and determining whether a transmission error has occurred between communication objects based on results of sending of the response message, and performing multicasting based on results of determination.

Preferably, sending the response message is configured to send an acknowledge message if the polling message is received, or to send a negative acknowledge message if the polling message is not received.

Preferably, performing the multicasting may be configured to, if the negative acknowledge message is sent, re-receive multicast data and recover an error.

Preferably, receiving the polling message may be configured to receive the polling message scheduled using epochs from the communication object that transmitted the multicast data.

Preferably, sending the response message may be configured to send the response message using feedback scheduling.

In accordance with another aspect of the present invention to accomplish the above object, there is provided a multicast apparatus including a search unit configured to search one or more communication objects in a distributed network environment, and to form a multicast group based on results of search; and a feedback error control unit configured to receive multicast data and a polling message from a sender-side communication object among the one or more communication objects, to determine whether a transmission error has occurred between communication objects, based on results of sending of a response message corresponding to the received polling message, and to perform multicasting based on results of determination.

Preferably, the feedback error control unit may include a multicast data reception unit configured to receive multicast data from a communication object within the multicast group; a polling message reception unit configured to receive the polling message from the communication object that transmitted the multicast data; a response transfer unit configured to transfer an acknowledge message or a negative acknowledge message corresponding to reception of the polling message; and an error recovery unit configured to, if the negative acknowledge message is transferred, re-receive multicast data from the sender-side communication object, and recovering the error.

Preferably, the polling message reception unit may receive the polling message scheduled using epoch from the communication object that transmitted the multicast data.

BRIEF DESCRIPTION OF THE DRAWINGS

The above and other objects, features and advantages of the present invention will be more clearly understood from the following detailed description taken in conjunction with the accompanying drawings, in which:

FIG. 8 is a diagram showing a method of recovering an error in the multicast apparatus according to an embodiment of the present invention.

DETAILED DESCRIPTION

Figure 1:
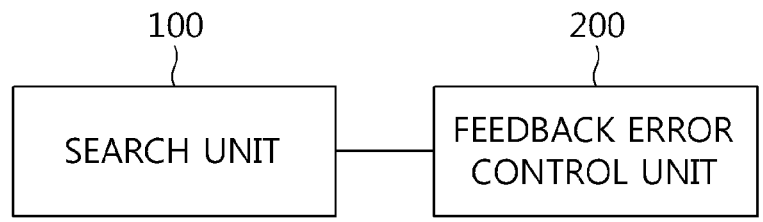
FIG. 1 is a configuration diagram schematically showing a multicast apparatus according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, a multicast apparatus and method according to an embodiment of the present invention will be described in detail with reference to the attached drawings.

FIG. 1 is a configuration diagram schematically showing a multicast apparatus according to an embodiment of the present invention.

First, a new multicast framework must be designed to efficiently transmit data between multiple communication objects in a distributed network requiring reliable data transmission. For this, a multicast apparatus is configured, as shown in FIG. 1.

Referring to FIG. 1, the multicast apparatus includes a search unit 100 and a feedback error control unit 200. The multicast apparatus is applied to the corresponding communication object.

The search unit 100 searches a communication object in a distributed network environment, and forms a multicast group based on the results of search.

In detail, the search unit 100 determines to cause a found communication object to join or leave a multicast group, and joins or leaves a session based on the results of the determination.

The feedback error control unit 200 performs control such that polling messages are scheduled using epochs based on a multicast group formed by a sender-side communication object, and also performs control such that a receiver-side communication object makes a response with Acknowledge (ACK) or Negative ACK (NACK) using feedback scheduling and determines whether to perform error recovery based on the results of the response.

That is, the feedback error control unit 200 according to the embodiment of the present invention may perform feedback error control if the multicast group is formed by the search unit 100, thus transmitting reliable multicast data.

Next, the feedback error control unit 200 of the multicast apparatus will be described in detail with reference to FIGS. 2 and 3.

Figure 2:
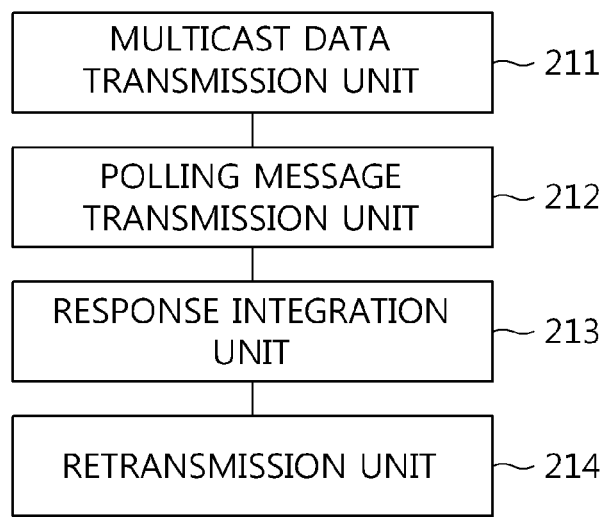
FIG. 2 is a configuration diagram showing a sender-side feedback error control unit according to an embodiment of the present invention.

FIG. 2 is a configuration diagram showing a sender-side feedback error control unit according to an embodiment of the present invention.

Referring to FIG. 2, a sender-side feedback error control unit 200 includes a multicast data transmission unit 211, a polling message transmission unit 212, a response integration unit 213, and a retransmission unit 214.

The multicast data transmission unit 211 transmits multicast data to at least one communication object within a multicast group.

The polling message transmission unit 212 checks the states of reception of messages by receiver-side communication objects by periodically sending a polling message.

The response integration unit 213 integrates the states of reception of communication objects which received the polling message.

The retransmission unit 214 retransmits multicast data if an error occurs in the reception states of the communication objects integrated by the response integration unit 213. In this way, the retransmission unit 214 may recover the error by retransmitting the multicast data. Here, the present invention may greatly decrease the number of messages by controlling a number of messages explosively increasing in the network in spite of an increase in the number of communication objects, thus providing an efficient multicast method capable of guaranteeing reliability.

Figure 3:
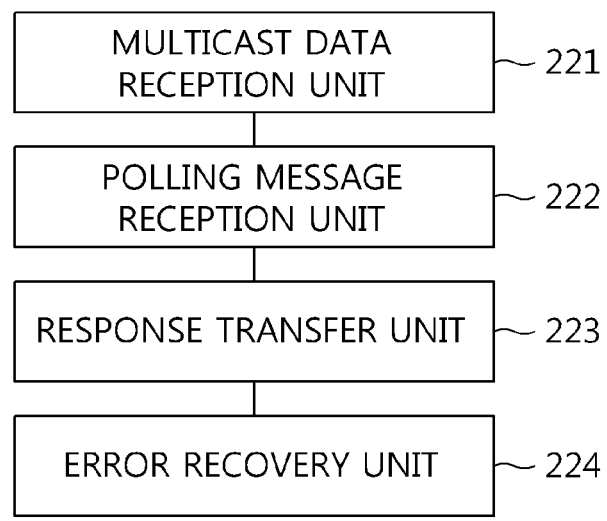
FIG. 3 is a configuration diagram showing a receiver-side feedback error control unit according to an embodiment of the present invention.

FIG. 3 is a configuration diagram showing a receiver-side feedback error control unit according to an embodiment of the present invention.

Referring to FIG. 3, the receiver-side feedback error control unit 200 includes a multicast data reception unit 221, a polling message reception unit 222, a response transfer unit 223, and an error recovery unit 224.

The multicast data reception unit 221 receives multicast data from a communication object within a multicast group.

The polling message reception unit 222 receives a polling message from the communication object which transmitted the multicast data.

The response transfer unit 223 transfers a response message corresponding to the reception of the polling message, for example, an Acknowledge message (ACK) or a Negative Acknowledge message (NACK).

The error recovery unit 224 re-receives multicast data from the communication object if an ACK message is not transferred, and then recovers an error. A method of recovering the error using the error recovery unit 224 will be described in detail with reference to FIG. 7.

Next, a multicast method will be described in detail with reference to FIG. 4.

Figure 4:
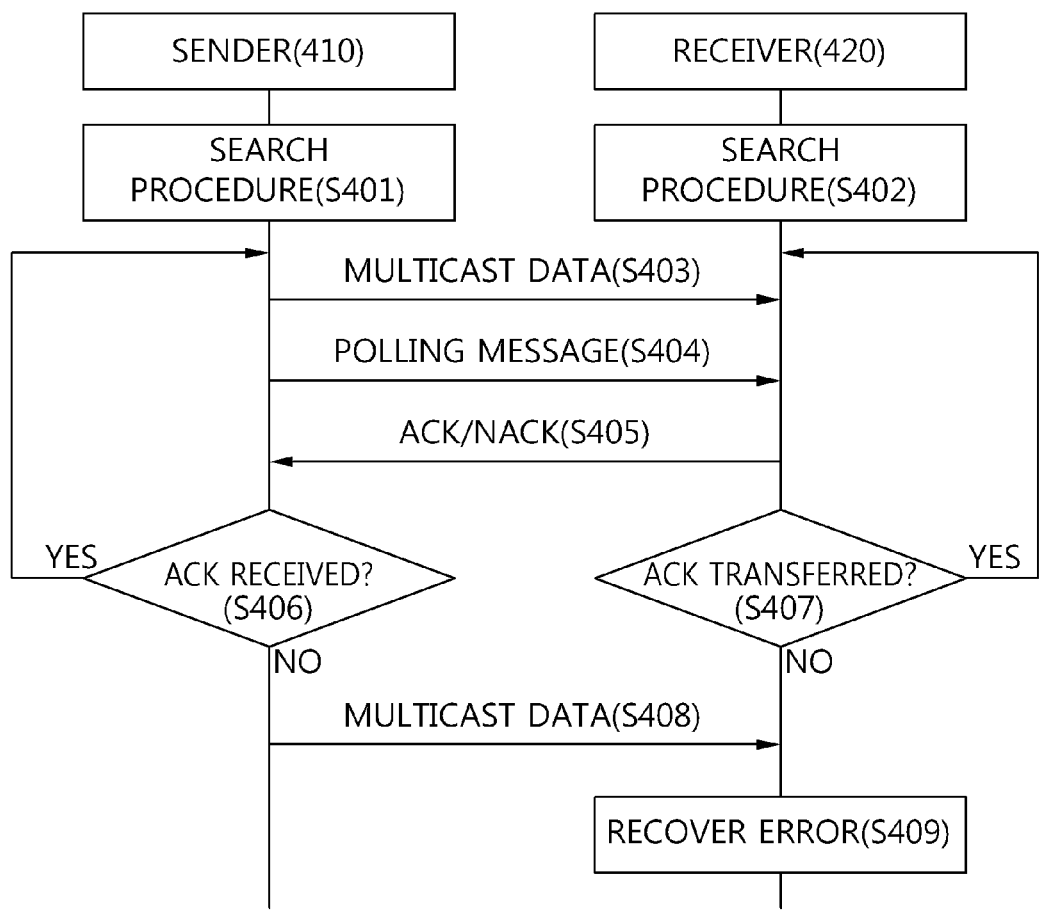
FIG. 4 is a flowchart showing a multicast method according to an embodiment of the present invention.

FIG. 4 is a flowchart showing a multicast method according to an embodiment of the present invention.

Referring to FIG. 4, an environment to which the multicast apparatus for performing the multicast method according to an embodiment of the present invention is applied includes a sender 410-side communication object and a receiver 420-side communication object. That is, a multicast apparatus is applied to each of the communication objects, and data may be efficiently transmitted in a distributed network requiring reliable data transmission between communication objects.

Below, in FIG. 4, a description will be made based on the multicast apparatus applied to the receiver 420-side communication object.

First, the multicast apparatus searches a communication object in a distributed network environment at steps S401 and S402, and forms a multicast group based on the results of search. In this case, the multicast apparatus for searching for the communication object may be located on each of the sender 410-side communication object and the receiver 420-side communication object.

The multicast apparatus receives multicast data from the sender 410-side communication object at step S403. Further, the multicast apparatus receives a polling message from the communication object which transmitted the multicast data at step S404.

The multicast apparatus transfers a response message corresponding to the reception of the polling message, for example, an Acknowledge message (ACK) or a Negative ACK message (NACK) to the sender 410-side communication object at step S405.

The sender 410-side communication object determines whether an ACK message has been received at step S406. Further, the multicast apparatus determines whether an ACK message corresponding to the reception of the polling message has been successfully transferred at step S407.

If the sender 410-side communication object cannot receive the ACK message, it retransmits multicast data at step S408.

The multicast apparatus re-receives the multicast data and recovers an error at step S409.

As at step S409, a method of recovering an error in the multicast apparatus will be described in detail later with reference to FIG. 8.

Next, the multicast apparatus may perform multicasting by recovering the error.

Then, a method by which the sender 410-side multicast apparatus schedules polling messages using epochs will be described in detail with reference to FIG. 5.

Figure 5:
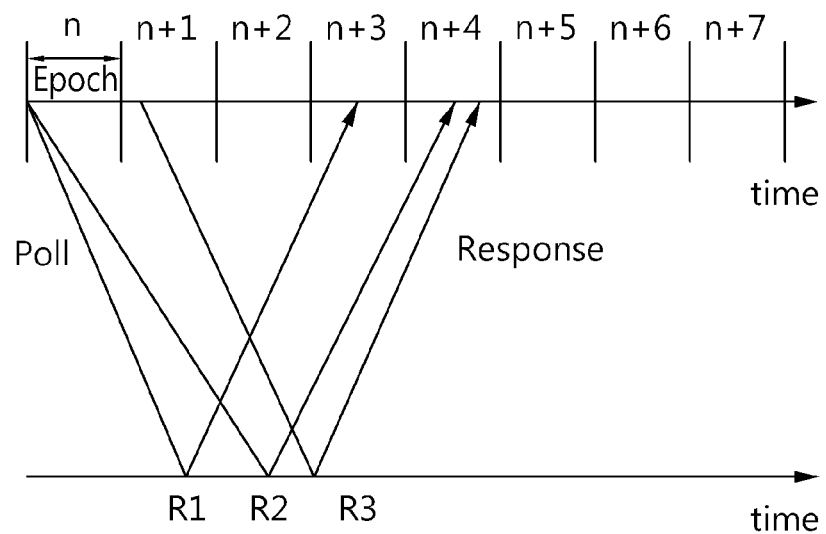
FIG. 5 is a diagram showing a method of scheduling polling messages using epochs according to an embodiment of the present invention.

FIG. 5 is a diagram showing a method of scheduling polling messages using epochs according to an embodiment of the present invention.

Epochs correspond to units in which a time interval is divided, and basic values for epochs may be set to, for example, 10 ms. Such epochs have sequence numbers and sequentially increase.

Referring to FIG. 5, communication objects corresponding to a multicast group include one sender and three receivers R1, R2, and R3. In this case, it can be seen that the sender divides the time interval into eight epochs, and epochs increase in the sequence of n, n+1, n+3, . . . , n+7.

The sender sends a polling message (Poll in FIG. 5) in an n-th epoch. Among the receivers, R1 and R2 receive polling messages sent in the n-th epoch, and send ACK or NACK messages as responses to the results of reception to the sender.

Then, the sender individually receives the ACK or NACK messages in an n+3-th epoch and an n+4-th epoch.

Further, the sender sends a polling message in the n+1-th epoch. Among the receivers, R3 receives the sent polling message in the n+4-th epoch, and sends an ACK or NACK message as a response to the results of reception to the sender. Then, the sender receives the ACK or NACK message in the n+4-th epoch.

As shown in FIG. 5, the sender 410-side multicast apparatus schedules polling messages using epochs, and is then capable of limiting the number of response messages ACKNACK which can be received in the corresponding epoch.

Below, an embodiment in which the number of response messages ACKNACK which can be received in each epoch is limited will be described in detail with reference to FIG. 6.

Figure 6:
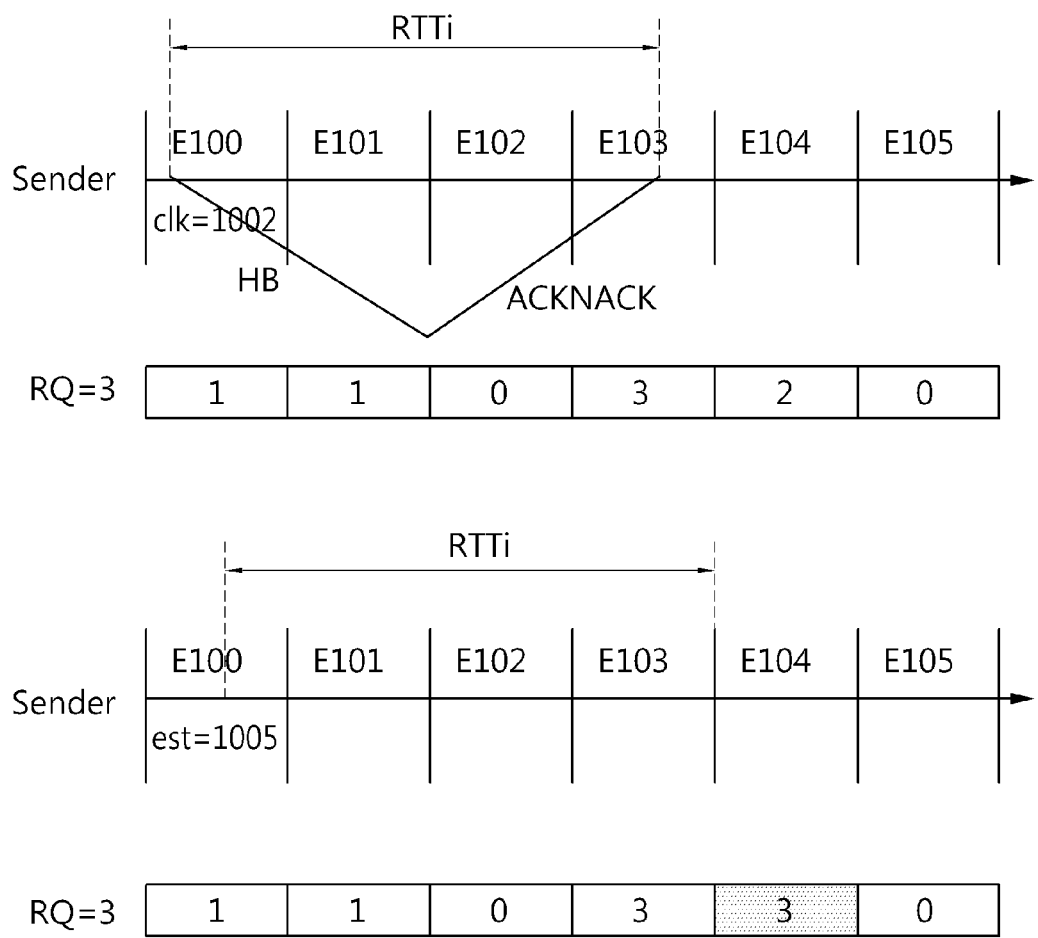
FIG. 6 is a diagram showing the limitation of the number of response messages that can be received in epochs according to an embodiment of the present invention.

FIG. 6 is a diagram showing the limitation of the number of responses messages ACKNACK which can be received in each epoch according to an embodiment of the present invention.

Referring to FIG. 6, it is assumed that the sender-side multicast apparatus limits the number of response messages ACKNACK (Response Quota: RQ), which can be received in an epoch, to "3."

For example, in FIG. 6, epochs are identified at intervals of 10 ms, and a count value in a clock counter (CLK) is increased every 1 ms. Therefore, in one epoch interval, 10 clock count values may be present.

When the count value of the clock counter CLK is 1002 (CLK=1002), a response message to a polling message sent in 100th epoch E100 is expected to be received in 103rd epoch E103, but the number of response messages ACKNACK (RQ) is limited to "3", and thus the response message ACKNACK must be received in 104th epoch E104.

For this, the sender sends a polling message when the count value of the clock counter is 1005, and thus the sender may receive a response message ACKNACK in the 104th epoch E104 without exceeding the reception limit of the response message ACKNACK. Here, the value of the clock counter being 1005 corresponds to an estimated value and may be calculated using an existing Round Trip Time (RTRi).

Below, a method by which the receiver 420-side multicast apparatus transfers a response message using feedback scheduling will be described in detail with reference to FIG. 7.

Figure 7:
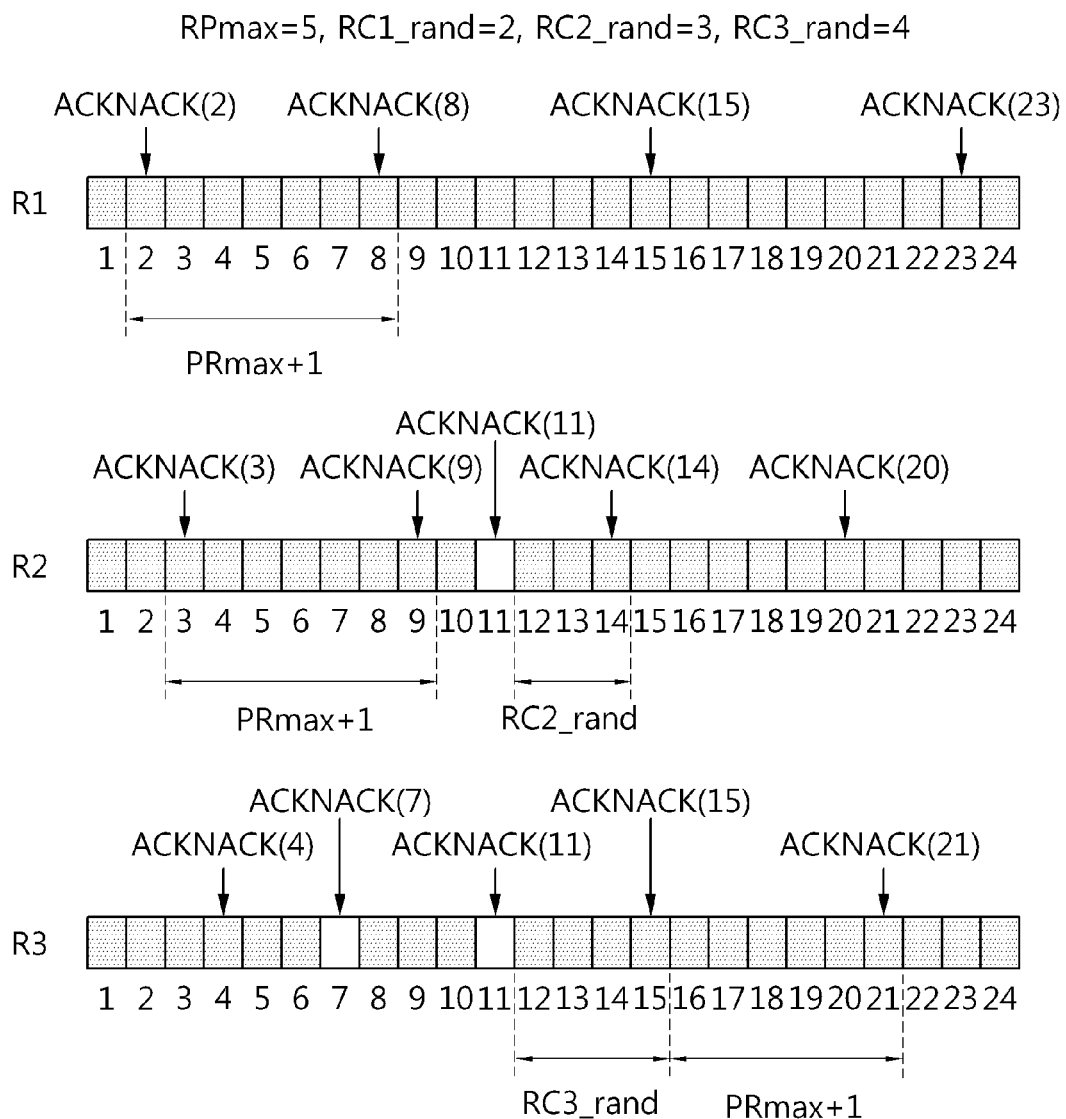
FIG. 7 is a diagram showing a method of transferring response messages using feedback scheduling according to an embodiment of the present invention.

FIG. 7 is a diagram showing a method of transferring a response message using feedback scheduling according to an embodiment of the present invention.

Referring to FIG. 7, a communication object corresponding to a multicast group includes one sender and three receivers R1, R2, and R3. In such an environment, feedback scheduling in which individual receivers R1, R2, and R3 make responses with response messages ACKNACK to a polling message sent by one sender will be described below.

First, the term "Response Period MAX (RPmax)" denotes an interval at which, if a receiver successfully receives pieces of consecutive data, the corresponding receiver simultaneously sends response messages ACKNACK to the pieces of data having been received to date in a lump, and such an interval may be set to, for example, "5." Further, RPmax may be variably set depending on the situation (context) of the network.

Since the receiver R1 has sent a response message ACKNACK twice (ACKNACK=(2)) and has successfully received the pieces of consecutive data, it sends a response message eight times after the interval "RPmax+1=6" has elapsed. Thereafter, the receiver R1 sends a response message 15 times (ACKNACK=(15)) and 23 times (ACKNACK=(23)) after the interval RPmax+2 and the interval RPmax+3 have elapsed, respectively.

Further, each receiver may vary a point of time at which a response message ACKNACK is initially sent. For example, the drawing shows that, after receiving a 2nd response message, the receiver R1 sends a response message, and that, after receiving 3rd and 5th response messages, the receivers R2 and R3 send response messages, respectively. This may be initially set depending on the Internet Protocol (IP) addresses or logical ID values of the receivers.

If each receiver has successfully received the pieces of consecutive data, the ACK message is transferred via the above method. However, if the corresponding message cannot be received due to a network error or an abnormal situation, the receiver immediately notifies the sender of the occurrence of the error by sending a NACK message.

If, in the event of a data error, the receiver sends a NACK message, receives a retransmitted message, recovers the error, and successfully receives pieces of consecutive data, an interval (RCi_rand (Response Constance)) at which response messages are to be sent in a lump with respect to the data having received to date may be set. The intervals at which the response messages are to be sent are set to different intervals for respective receivers.

In FIG. 7, the receivers R1, R2, and R3 set the intervals (RCi_rand), at which response messages are to be sent, to 2, 3, and 4 (RC1_rand=2, RC2_rand=3, and RC3_rand=4). In this way, the intervals at which the response messages are to be sent may be set depending on the IP addresses or the logical ID values of the receivers. For example, when a receiver sends a response message and does not receive a retransmitted message, it may repeatedly send the response message.

Next, a method of recovering an error in the multicast apparatus will be described in detail with reference to FIG. 8.

FIG. 8 is a diagram showing a method of recovering an error in the multicast apparatus according to an embodiment of the present invention.

First, the sender transmits multicast data to the multicast apparatus, and an error occurs when the multicast apparatus does not successfully receive the multicast data. Here, the multicast apparatus corresponds to a receiver-side communication object.

If an error occurs, the multicast apparatus sends a response message ACKNACK to notify the sender of the occurrence of the error.

The sender retransmits a polling message so as to recover the error while monitoring the states of the receivers using the sequence numbers of the transmitted multicast data. In this case, a method of efficiently retransmitting the polling message is shown in FIG. 8.

Referring to FIG. 8, Status (seq) denotes status information required to check and manage whether, for each of the sequence numbers (seq) of polling messages sent by the sender, the receiver has successfully received the polling message. Here, the status information includes information indicative of a state in which data is not transmitted (Unsent), a state in which data is being transmitted (underway), a state in which the states of receivers are being collected (In_Collection), a state in which transmission of data is acknowledged (Acknowledged), and a state in which data is being retransmitted (Retransmitted).

Below, a method of performing a state transition depending on polling messages sent by the sender will be described in detail with reference to FIG. 9.

Figure 9:
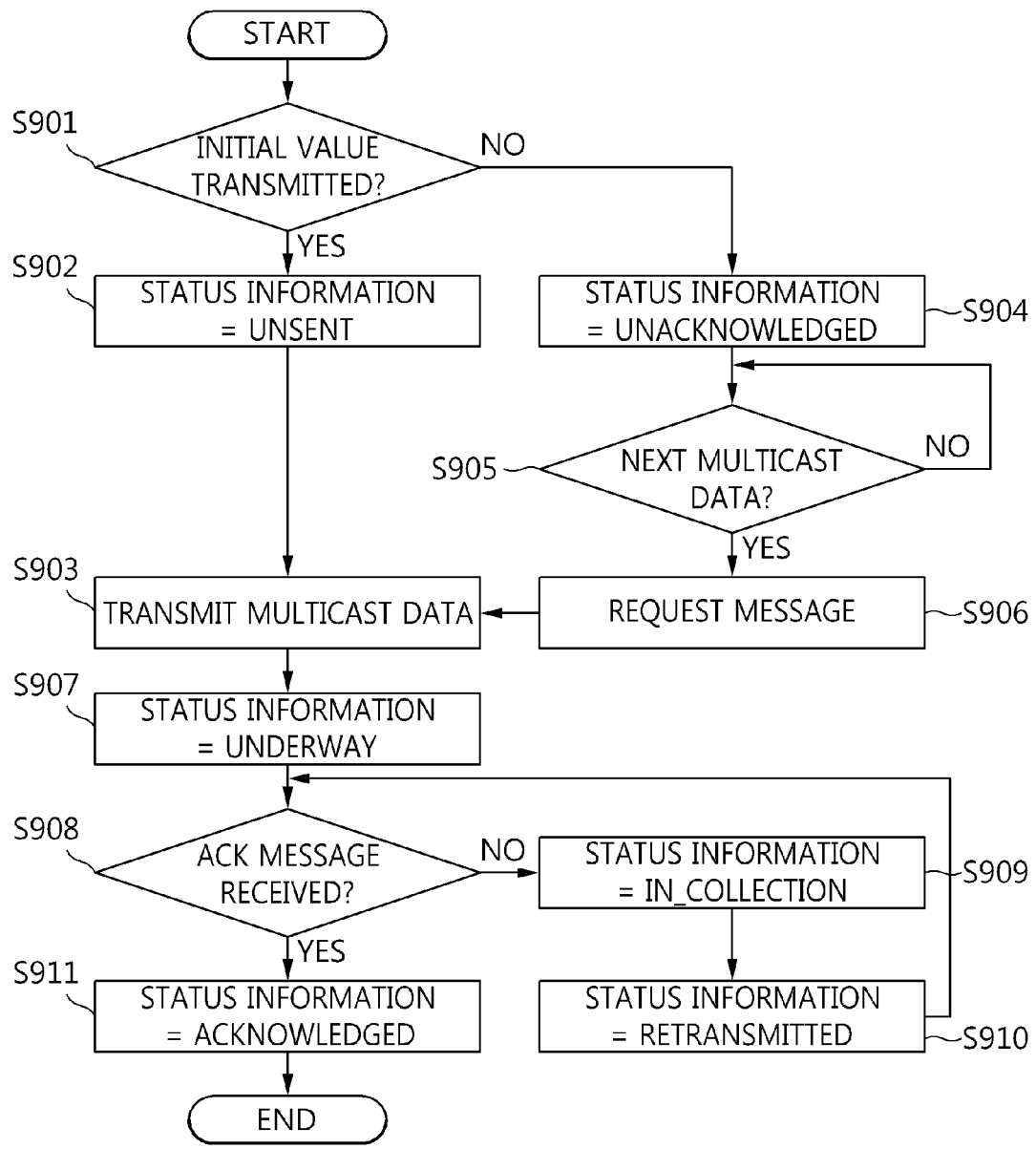
FIG. 9 is a diagram showing the flow of state transition according to an embodiment of the present invention.

FIG. 9 is a flowchart showing the flow of a state transition according to an embodiment of the present invention.

Referring to FIG. 9, a sender determines whether initial multicast data corresponding to an initial value has been transmitted at step S901.

If the sender has not transmitted the initial value at step S901, status information is set to 'Unsent' at step S902. Here, the state 'Unsent' denotes a state in which the sender has not yet transmitted the initial value.

The sender transmits multicast data in the unsent state at step S903.

If it is determined at step S901 that the transmission of the initial value has not yet been acknowledged, the sender causes the status information to make a transition to 'Unacknowledged' at step S904. Next, the sender determines whether next multicast data is transmitted, and requests a message if it is determined that next multicast data is not transmitted at step S906.

If the sender transmits the multicast data (corresponding to multicast(seq) in FIG. 8), status information makes a transition to 'Underway' at step S907.

In a state in which the status information is in 'Underway', the sender determines whether an Acknowledge message (ACK) among response messages corresponding to the reception of the polling message has been received at step S908.

In a state in which the status information is in 'Underway', if it is determined that a list of receivers (naked(seq)) which sent a Negative Acknowledge (NACK) message is present, the sender makes a transition to 'In_collection' at step S909. Here, the receiver list denotes a list including the IP addresses or logical IDs of receivers which sent the NACK message because a message error occurs in the polling message.

When the status information is in 'In_collection,' if the number of receivers in the receiver list exceeds a Multicast Threshold Rate (MTR), the sender retransmits the corresponding sequence number, and causes the status information to make a transition to 'Retransmitted' at step S910. Here, MTR corresponds to the maximum allowable value of the number of receivers which cannot receive multicast data.

If the number of receivers in the receiver list does not exceed the MTR, the sender waits until the number of receivers that have been referred to or have been polled becomes identical to the total number of receivers, and thereafter retransmits data that caused errors using a unicast method. After the data has been retransmitted, that is, when the status information is in 'Retransmitted', if the sender re-receives a NACK message, the sender retransmits the data using a unicast method. The MTR according to the embodiment of the present invention may be changed depending on the situation of the network, and the present invention is not limited thereto.

In a state in which the status information is in 'Underway', if the sender receives an ACK message, the status information makes a transition to 'Acknowledged' at step S911.

In accordance with the present invention, the multicast apparatus and method may guarantee reliability in a distributed network environment.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A multicast method comprising:
searching, by a multicast apparatus, one or more communication objects in a distributed network environment;
receiving multicast data from a sender-side communication object among the one or more communication objects;
receiving a polling message from the communication object that transmitted the multicast data;
sending a response message corresponding to the polling message; and
determining whether a transmission error has occurred between communication objects based on results of sending of the response message, and performing multicasting based on results of determination.

2. The multicast method of claim 1, wherein sending the response message is configured to send an acknowledge message if the polling message is received, or to send a negative acknowledge message if the polling message is not received.

3. The multicast method of claim 2, wherein performing the multicasting is configured to, if the negative acknowledge message is sent, re-receive multicast data and recover an error.

4. The multicast method of claim 1, wherein receiving the polling message is configured to receive the polling message scheduled using epoch from the communication object that transmitted the multicast data.

5. The multicast method of claim 1, wherein sending the response message is configured to send the response message using feedback scheduling.

6. A multicast apparatus comprising:
a search unit configured to search one or more communication objects in a distributed network environment, and to form a multicast group based on results of search; and
a feedback error control unit configured to receive multicast data and a polling message from a sender-side communication object among the one or more communication objects, to determine whether a transmission error has occurred between communication objects, based on results of sending of a response message corresponding to the received polling message, and to perform multicasting based on results of determination.

7. The multicast apparatus of claim 6, wherein the feedback error control unit comprises:
a multicast data reception unit configured to receive multicast data from a communication object within the multicast group;
a polling message reception unit configured to receive the polling message from the communication object that transmitted the multicast data;
a response transfer unit configured to transfer an acknowledge message or a negative acknowledge message corresponding to reception of the polling message; and
an error recovery unit configured to, if the negative acknowledge message is transferred, re-receive multicast data from the sender-side communication object, and recovering the error.

8. The multicast apparatus of claim 7, wherein the polling message reception unit receives the polling message scheduled using epoch from the communication object that transmitted the multicast data.

* * * * *